United States Patent
Schroeter

(10) Patent No.: US 11,544,742 B2
(45) Date of Patent: *Jan. 3, 2023

(54) TARGETING MEDIA DELIVERY TO A MOBILE AUDIENCE

(71) Applicant: AT&T Intellectual Property I, L.P., Atlanta, GA (US)

(72) Inventor: Horst Juergen Schroeter, Vero Beach, FL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/991,777

(22) Filed: Aug. 12, 2020

(65) Prior Publication Data

US 2020/0372541 A1 Nov. 26, 2020

Related U.S. Application Data

(62) Division of application No. 14/087,936, filed on Nov. 22, 2013, now Pat. No. 10,783,555.

(51) Int. Cl.
*G06Q 30/02* (2012.01)
*H04W 4/02* (2018.01)

(52) U.S. Cl.
CPC ........ *G06Q 30/0261* (2013.01); *H04W 4/027* (2013.01)

(58) Field of Classification Search
CPC ... H04M 3/4878; G06Q 30/02; G06Q 30/025; H04W 4/029
See application file for complete search history.

(56) References Cited

U.S. PATENT DOCUMENTS

| | | | |
|---|---|---|---|
| 6,484,148 B1 | 11/2002 | Boyd | |
| 6,571,279 B1 | 5/2003 | Herz et al. | |
| 6,731,940 B1 | 5/2004 | Nagendran | |
| 7,482,910 B2 | 1/2009 | Melvin | |
| 7,536,190 B1 | 5/2009 | Creemer | |
| 7,623,823 B2 * | 11/2009 | Zito | G06Q 30/0261 455/2.01 |
| 8,073,460 B1 | 12/2011 | Scofield et al. | |
| 8,402,356 B2 | 3/2013 | Martinez et al. | |
| 8,589,230 B1 | 11/2013 | Bickerstaff et al. | |
| 2002/0135515 A1 | 9/2002 | Rankin et al. | |
| 2003/0046158 A1 | 3/2003 | Kratky et al. | |
| 2003/0115098 A1 | 6/2003 | Kang | |
| 2008/0004953 A1 | 1/2008 | Ma et al. | |

(Continued)

*Primary Examiner* — Saba Dagnew
(74) *Attorney, Agent, or Firm* — Guntin & Gust, PLC; Jay Anderson

(57) ABSTRACT

A system that incorporates the subject disclosure may perform, for example, operations including determining a representative trajectory of a number of mobile devices relative to a media presentation device, such as a digital billboard. An audience of the number of mobile devices is identified and user characteristics are obtained of the audience. A representative interest of the audience is determined from the user characteristics of the audience, and a media content item is selected according to the representative interest and the representative trajectory. The media content item is presented at the media presentation device to expose the audience to the media content item. Other embodiments are disclosed.

20 Claims, 7 Drawing Sheets

(56) References Cited

U.S. PATENT DOCUMENTS

| | | | |
|---|---|---|---|
| 2008/0059994 A1 | 3/2008 | Thornton et al. | |
| 2009/0197616 A1* | 8/2009 | Lewis | G06Q 30/0212 455/456.1 |
| 2009/0204484 A1 | 8/2009 | Johnson | |
| 2009/0217315 A1 | 8/2009 | Malik et al. | |
| 2009/0222351 A1 | 9/2009 | Wang | |
| 2009/0265215 A1* | 10/2009 | Lindstrom | G06Q 30/0203 705/7.32 |
| 2009/0298514 A1* | 12/2009 | Ullah | G06Q 30/02 340/572.1 |
| 2011/0016480 A1* | 1/2011 | Opdycke | H04N 21/41415 382/103 |
| 2011/0035282 A1 | 2/2011 | Spatscheck et al. | |
| 2011/0065376 A1* | 3/2011 | Forutanpour | H04W 4/185 709/219 |
| 2011/0207440 A1 | 8/2011 | Ruuspakka et al. | |
| 2012/0041825 A1* | 2/2012 | Kasargod | G06Q 30/02 705/14.68 |
| 2013/0031177 A1 | 1/2013 | Willis et al. | |
| 2013/0041753 A1 | 2/2013 | Sathyanath et al. | |
| 2013/0117121 A1 | 5/2013 | Raman et al. | |
| 2013/0198299 A1 | 8/2013 | Chhaochharia et al. | |
| 2013/0232000 A1 | 9/2013 | van Datta et al. | |
| 2013/0339140 A1 | 12/2013 | Pokorny et al. | |
| 2013/0345967 A1* | 12/2013 | Pakzad | G01C 21/206 701/431 |
| 2014/0379477 A1* | 12/2014 | Sheinfeld | G06Q 30/0251 705/14.58 |

\* cited by examiner

TARGETING MEDIA DELIVERY TO A MOBILE AUDIENCE

CROSS-REFERENCE TO RELATED APPLICATIONS

This application is a divisional of U.S. application Ser. No. 14/087,936, filed Nov. 22, 2013, which is incorporated herein by reference in its entirety.

FIELD OF THE DISCLOSURE

The subject disclosure relates to targeting media delivery to a mobile audience.

BACKGROUND

Media content, such as advertisements or informative messages, can be presented on configurable media presentation devices, such as electronic billboards. Such electronic billboards can be located in public locations, such as, roadways, airports, hotels, or shopping centers. One advantage of electronic billboards, relative to traditional printed billboards, is that the advertisements presented on the electronic billboard can be easily changed. For electronic billboards connected to a network, advertisements can be downloaded and/or changed, on the electronic billboard, as desired by the advertisement provider.

BRIEF DESCRIPTION OF THE DRAWINGS

Reference will now be made to the accompanying drawings, which are not necessarily drawn to scale, and wherein.

DETAILED DESCRIPTION

Figure 1:
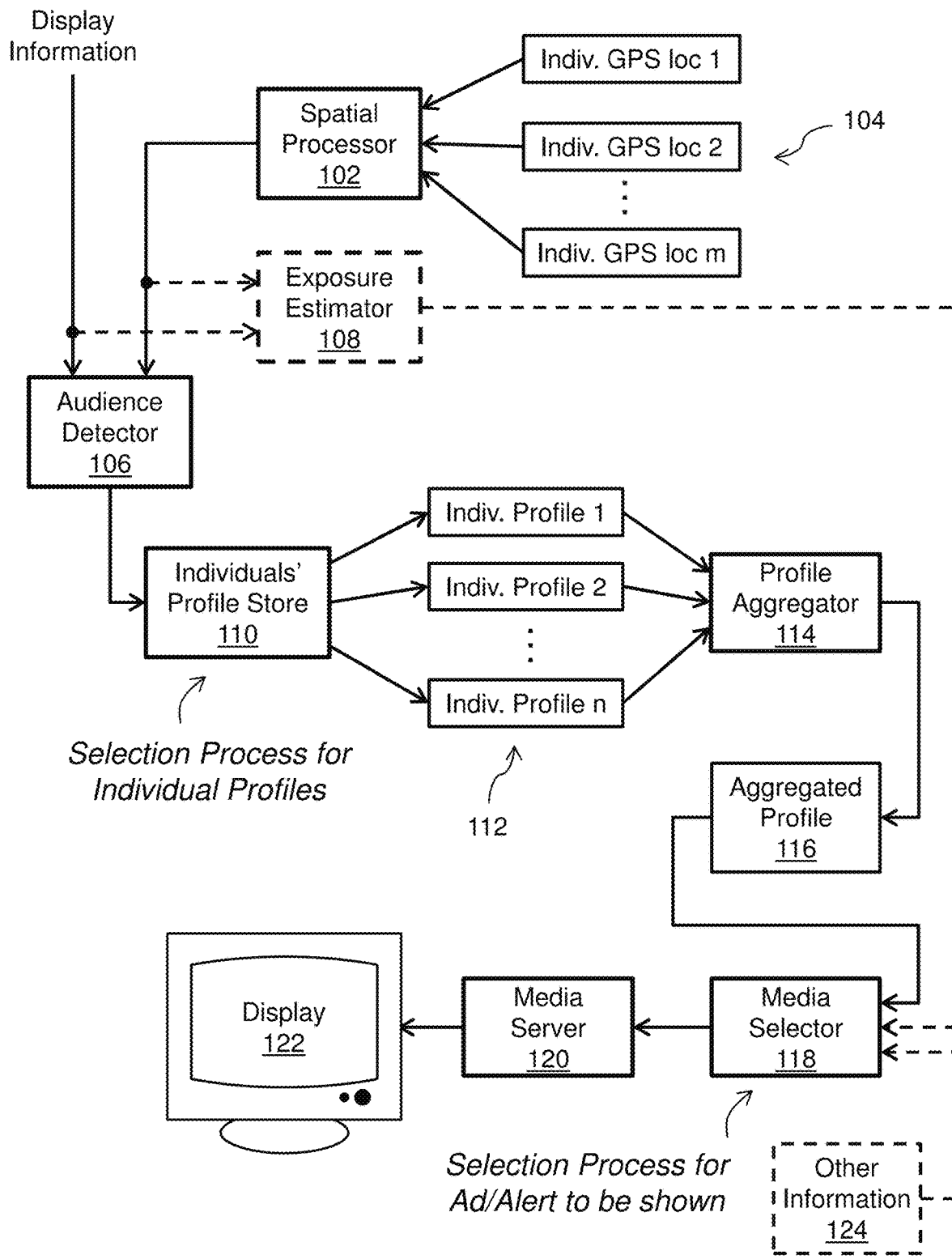
FIG. 1 depicts an illustrative embodiment of a system that selects media content for presentation at a media presentation device.

The subject disclosure describes, among other things, illustrative embodiments of determining trajectories of a number of mobile devices with respect to a media presentation device, such as a digital billboard. A representative interest is determined for an audience of users associated with the number of mobile devices, and a media content item is selected according to the representative interest for presentation at the media presentation device. Other embodiments are included in the subject disclosure.

One embodiment of the subject disclosure includes a process implemented by a system comprising a processor. The process includes determining a representative trajectory of a number of mobile devices relative to a digital billboard, and identifying an audience, wherein the audience comprises users of the number of mobile devices. The process further includes obtaining user characteristics of the audience, and determining a representative interest of the audience from the user characteristics of the audience. An exposure is estimated of the audience to the digital billboard based on the representative trajectory of the number of mobile devices relative to the digital billboard. A media content item is selected according to the representative interest and the exposure, and the media content item is presented at the digital billboard to expose the audience to the media content item.

Another embodiment of the subject disclosure includes a system having a processor and a memory that stores executable instructions. The executable instructions, when executed by the processor, facilitate performance of operations including determining a representative trajectory of a number of mobile devices relative to a media presentation device. The operations further include identifying an audience, wherein the audience comprises users of the number of mobile devices. User characteristics of the audience are obtained, and a representative interest of the audience is determined from the user characteristics of the audience of users. An exposure is estimated of the audience to the media presentation device, and the estimate is based on the representative trajectory of the number of mobile devices relative to the media presentation device. A media content item is selected according to the representative interest and the exposure, and the media content item is presented at the media presentation device to expose the audience to the media content item.

Yet another embodiment of the subject disclosure includes a machine-readable storage medium having executable instructions that when executed by a processor, facilitate performance of operations. The operations include determining a representative trajectory of a number of mobile devices relative to a media presentation device and identifying an audience of users of the number of mobile devices. User characteristics are obtained of the audience, and a representative interest is determined of the audience from the user characteristics of the audience. A media content item is selected according to the representative interest and the representative trajectory, and the media content item is presented at the media presentation device to expose the audience to the media content item.

FIG. 1 depicts an illustrative embodiment of a system 100 that selects media content, e.g., informative messages and/or advertising, for presentation at a media presentation device, e.g., a digital billboard 122. The system 100 includes a spatial processor 102 configured to receive mobility information related to a number of mobile devices, including mobile devices within a region or area including the digital billboard 122. The mobile devices can include mobile communication devices, such as mobile phones, tablet computers, personal digital assistants, laptop computers and the like. The mobility information can include, e.g., a location, position, bearing, motion or some other spatial reference related to the location or position for each mobile device. In the illustrative example, the spatial processor 102 receives geospatial information 104 by way of geospatial coordinates, e.g., from Global Positioning Satellite (GPS) receivers operating within each of "m" different mobile device.

The geospatial information 104, e.g., coordinates can be obtained indirectly, e.g., from a mobility service provider and/or a third-party operator collecting the geospatial information 104 from the mobile devices. Alternatively or in addition, the spatial processor 102 receives the geospatial information 104 reported by each of the mobile devices. Such self-reported information can be provided by the mobile devices, e.g., as a result of a user of each mobile device "opting in" or otherwise choosing to participate in self reporting of such information. In some embodiments, self-reported information is obtained by way of special communications and/or routine communications, e.g., with radio communication towers of the mobile service provider. Mobile service providers can track whereabouts of mobile devices in order to determine proximity to cell towers.

The geospatial information 104 can be obtained by other techniques, such as processing of mobile communications not necessarily reporting the geospatial information 104. Such techniques can include, without limitation, mobile phone tracking techniques to determine or otherwise estimate a current position of a mobile device whether stationary or moving. Localization of the mobile device can be obtained, e.g., using one or more of signal amplitude and signal propagation delay between the mobile device, one or more other mobile devices and/or radio communication towers of one or more mobility service providers. Such location techniques include processes referred to generally as multilateration.

An audience detector 106 is in communication with the spatial processor 102, and receives a first input from the spatial processor 102. The audience detector 106 also receives a second input related to a media presentation device, such as a digital display or digital billboard 122. The second input can be obtained from a separate source, such as a digital billboard sales and/or management organization providing information related to one or more digital billboards 122, from the digital billboard itself, or from a database and/or configuration file that may be local to the audience detector 106. The digital billboard information can include spatial information, e.g., a location in geo-coordinates, an address, or some other suitable spatial reference. Alternatively or in addition, the second input can include information related to one or more of a description of the digital billboard, e.g., a make and model. Other information provided by way of the second input can include device specifications, e.g., screen size, pixel size/density, intensity, and/or site specific information. Examples of site-specific information include whether a device is located indoors/outdoors, a height of the display, an orientation, e.g., compass heading or reference to some other landmark, a description of the surrounding environment, e.g., whether the digital display is located along a roadway, within a building.

The audience detector 106 identifies users of the m mobile devices reported by the spatial processor 102 exposed to media content presented at the media presentation device, e.g., digital billboard 122. The audience can be identified in real-time, e.g., indicating that the audience is currently within an exposure region defined with respect to the media presentation device. Alternatively or in addition, the audience can be identified before audience members are actually within the exposure region, by applying trajectories of the mobile devices and determining that the mobile devices will be within the exposure region at a determinable time, e.g., within some number of seconds or minutes.

Such anticipation of mobile devices about to enter an exposure region allows time for media content items to be pre-selected and/or queued for presentation at a future time at which the mobile devices are estimated to be within the exposure region. A determination as to when the mobile devices actually enter the exposure region can be determined by updates from the spatial processor confirming updated spatial information, e.g., positions, within the exposure region. Alternatively or in addition, a determination as to when the mobile devices enter the exposure region can be estimated, e.g., from information from the spatial processor obtained before the mobile device enters the exposure region along with an estimate as to when the mobile device will enter the exposure region.

The exposure region can be defined, e.g., as a region defined within an area located in front of the digital billboard 122. The area can extend from a surface of the digital billboard 122, or from a minimum exposure distance in front of the digital billboard 122, e.g., one half, one quarter or some other fraction of a width of the digital billboard, out to a maximum viewing distance. The maximum viewing distance can be determined as a distance beyond which the media content portrayed at the digital billboard can be understood. The maximum viewing distance can also be determined, e.g., as a number of widths, e.g., 10, 20, 50 or some other number times the width of the digital billboard 122. The shape of the area can be any suitable shape, such as a polygon, e.g., a rectangle, a trapezoid, a semi-circle, semi-ellipse or some combination, e.g., as might be affected from blockages, e.g., walls, buildings. The shape of the viewing area is generally defined by the area within which the media content can be understood and beyond which the media content cannot be understood or otherwise resolved. The minimum and/or maximum ranges can be determined according to the nature of the media content itself, e.g., whether it contains text, whether it contains still and/or moving images and so forth.

Although the above refers to determining when the mobile device(s) enter the exposure region, similar techniques can be employed to determine when a mobile device, having been within the exposure region, exits the exposure region. For example, identification of a user of a mobile device as an audience member can be associated with a duration during which the mobile device falls within the exposure region. As other mobile devices enter and leave the exposure region, an audience of users of the mobile devices can be updated to account for an update to audience membership. Thus, at any given instant, the audience membership can be determined according to those mobile devices then within the exposure region. Updates to the audience membership can be accomplished on an event basis, e.g., upon a mobile device entering or leaving the exposure region, on a time bases, e.g., according to a refresh rate or update schedule, e.g., every 1 second, 5 seconds, 30 seconds, 1 minute, and so forth. Audience membership can be determined in a predictive manner as disclosed above, and/or retained as a historical record of when users of mobile devices were identified as audience members.

Historical records of audience membership can be useful, e.g., to allow for tailored message(s), such as a sequence of messages that collectively are intended to convey information in a predetermined sequence. By way of non-limiting example, such sequenced messages can include sequenced advertisements in which later advertisements make some reference or otherwise include reference to prior advertisements. Alternatively or in addition, historical records of prior audience association can be used to track or otherwise associate activities of particular users. Such tracking can include, without limitation, subsequent search request, purchases, travel and the like.

The system 100 includes an individuals' profile store 110 providing access to ancillary information related to one or more members of the audience. The individuals' profile store 110 is in communication with the audience detector 106, receiving inputs from the audience detector 106, e.g., to identify members of an audience of users of the mobile devices. The individuals' profile store 110 can access one or more individual profiles, or individual profiles 112 related to the members of the audience. In the illustrative example, the audience includes 'n' members associated with n mobile devices of the 'm' mobile devices reported by the spatial processor 102. Generally, the number of audience members 'n' is less than or equal to the number of mobile devices 'm,' i.e., n≤m.

The individual profiles 112 can include information in the form of individual profiles. The individual profiles can include one or more of information entered by a corresponding user of the users of the mobile devices, including those mobile devices reported by the spatial processor 102. The information can be entered directly, e.g., by those users choosing to opt-in to a message service and/or indirectly according to information collected by one or more third parties related to the same user. Information of the individual profiles 112 can include demographic information, such as gender, age, address, income, spending habits, affiliations, e.g., school(s), employer(s), professional organizations, clubs and so forth. Alternatively or in addition, the information of the individual profiles 112 can include psychographic information, e.g., related to attitudes, needs, values and mental postures. Such psychographic information can be obtained from a psychographic analysis, e.g., obtained voluntarily by a test administered to the user of the mobile device and/or indirectly by monitored activity, e.g., from historical records of online activity.

A profile aggregator 114 is in communication with the individuals' profile store 110, receiving the individual profiles 112 retrieved by the individuals' profile store 110. The profile aggregator 114 determines a profile 116, e.g., an aggregate profile, representative of the audience of users determined by the audience detector 106. Determination of the aggregate profile 116 can be a representative profile of one or more audience members. For example, one or more characteristics or features of individual profiles 112, such as age and/or gender, can be used to sort the individual profiles 112 into groups of profiles, e.g., compliant with the one or more features. The resulting groups of profiles can be arranged or otherwise sorted, e.g., according to compliance with the one or more features.

The profile aggregator 114 can perform an analysis of the results, e.g., to determine numbers of audience members sorted into each of one or more groups of profiles. An aggregate profile 116 can be selected, e.g., as a profile according to the greatest number of individual profiles 112 compliant with the particular features. Alternatively or in addition, the one or more features used to sort the individual profiles 112 can be weighted or otherwise assigned an order of preference. The aggregate profile 116 can thus be determined according to a weighted ranking of the individual profiles. The aggregate profile 116 can also be generated by selecting or otherwise "cherry picking" particular users according to one or more predetermined characteristics. If more than one, so-called, high value user is identified, the aggregate profile 116 can correspond to the high value user's characteristics over the characteristics of a relative larger number of lesser valued users. By way of example, a message or advertising directed to women can select user profiles of female users of the mobile devices, while essentially disregarding characteristics of male users of the mobile devices.

In at least some embodiments, an aggregate profile 116 might not reflect any individual profile of the individual profiles 112. Instead, the aggregate profile 116 can be determined as a composite, e.g., picking and choosing among various features of the individual profiles 112 to determine a composite profile. By way of non-limiting example, such a composite aggregate profile 116 can include a profile determined by selecting individual features according to the greatest numbers and/or weighted numbers of individual profiles, averages or other statistical combination of such features of individual profiles 112.

A media selector 118 is in communication with the profile aggregator 114, receiving the aggregate profile 116 from the profile aggregator 114. In at least some embodiments, the media selector 118 receives, from the exposure estimator 108 (shown in phantom), an estimate of an exposure of the audience members to the digital display. Alternatively or in addition, the media selector 118 receives one or more other information items 124, e.g., from ancillary information sources. Examples of such ancillary information can include, without limitation, time of day, day of the week, season, prior history of one or more users of the audience of users.

The media selector 118 selects or otherwise recommends media content items for presentation at the media presentation device, e.g., the digital billboard 122. Such recommendations can be based on one or more of the aggregated profile 116, the exposure estimator 108 and/or the other information items 124. The media selector 118 can determine from the input from the exposure estimator 108 how long the audience member(s) are exposed to the media content item displayed at the digital billboard 122. The determination can be based, e.g., upon trajectory information of the mobile devices provided by the spatial processor, to estimate when the audience member(s) are/will be within the exposure region and/or how long the audience member(s) will remain within the exposure region. The trajectory information for individual mobile devices can be combined or otherwise used to determine a representative trajectory of a number of mobile devices. For example, the representative trajectory can be determined according to a statistical evaluation, e.g., an average, of the individual trajectories.

By way of illustrative example, exposure estimates for a roadside digital billboard would be substantially different depending on one or more of the time, day and location. An exposure estimate determined during weekday rush hour, i.e., relatively long exposure, versus other times, such as nights and weekends, i.e., relatively short exposure, and would be substantially different. The former can be measured, e.g., in minutes; whereas, the latter can be measured in seconds.

Depending upon the duration of exposure, the media selector 118 can select an information message format suited to the time of exposure. Particular information messages, such as advertisements, can be pre-configured in different formats, e.g., a five or ten second message versus a 30 second message. The media selector 118 having determined an exposure time chooses or otherwise selects the appropriate message to improve or enhance effectiveness—choosing the short format for non-rush hour, versus the long format for rush-hour/traffic. Thus, a message and/or advertisement displayed during traffic jams can be different than a similar message, e.g., an advertisement to the same products and/or services. In some embodiments, an exposure threshold can be established based on one or more of the exposure region or the exposure time. For example, if an exposure time of the audience is determined to be greater than an exposure threshold, a particular message can be displayed. Multiple exposure thresholds can be established, such that one of a selection of different messages can be displayed according to the particular exposure time falling within a range of exposure thresholds.

In some embodiments, a value can be associated with one or more of the exposure time, the individual profiles and/or the aggregate profile 116. By way of non-limiting example, advertising campaigns can be crafted towards a particular demographic. Examples include advertising during sporting events that may be tailored to sports enthusiasts, versus advertising during children's' shows that may be tailored to children and/or adults on behalf of children. Thus, the media selector 118 can select a media content item suited for adult workers, e.g., an advertisement, based on the aggregate profile indicative of commuters. Such a conclusion that the audience members are adult workers can be determined from one or more of a realization that the message is being displayed on a major thoroughfare used heavily during weekday commuting times. Alternatively or in addition, such circumstantial indications as location, time of day, speed or velocity can be combined with other characteristics of the users of the mobile devices, such as individual profiles, e.g., age, gender and so forth.

It is also understood that the information obtained or otherwise determined by the system, e.g., by the media selector 118, can be used to determine revenue and/or value of the message and/or advertising segment or spot. The value can be responsive, e.g., to a number of audience members, a subset of audience members according to one or more particular characteristics, a duration of exposure, a location and/or any other information items 124, such as the examples disclosed above. Thus, a message/advertisement segment displayed to a relatively large number of audience members, e.g., resulting from heavy traffic within a vicinity of the digital billboard 122 can have a greater value than the same message/advertisement segment displayed to a relatively small number of audience members, e.g., during periods of light traffic. Reference to traffic can include one or more of numbers of audience members and/or a density of audience members within the exposure area, and/or exposure times.

The system also includes a media server 120 in communication between the media selector 118 and the digital billboard 122. The media server 120 can perform one or more functions related to display of the information message/advertisement at the digital billboard 122. By way of illustrative example and without limitation, functions related to display include buffering at least a portion of a media content item, scheduling of presentation of the media content item, formatting of the media content item, e.g., according to the particular digital billboard 122. One or more of the system components 102, 106, 108, 110, 114, 118, 120 can be provided as a standalone device or combined with one or more of the other devices.

It is also understood that one or more of the system components can service one or more devices of the system 100, e.g., redundant or duplicate, downstream devices to allow for economies of scale. For example, the spatial processor can be centrally located at a mobile service provider facility, a media service provider facility, or some third party facility, servicing multiple independent groups of mobile devices, e.g., at different locations with respect to different digital billboards 122. For example, a single digital billboard provided along a roadway can include two or more displays facing in two or more independent directions, e.g., opposite directions. Thus, the same infrastructure, in terms of system components 102, 106, 108, 110, 114, 118, 120 can be used to independently drive two digital billboards 122. During rush hour traffic, a first high value advertisement can be displayed in one direction, e.g., facing oncoming rush hour traffic, while a low value advertisement can be displayed in the other direction, e.g., facing the direction opposite to the rush hour traffic. The same message can be displayed simultaneously to each side of the billboard, differing by value, e.g., revenue derived from exposure of the digital content item.

Figure 2:
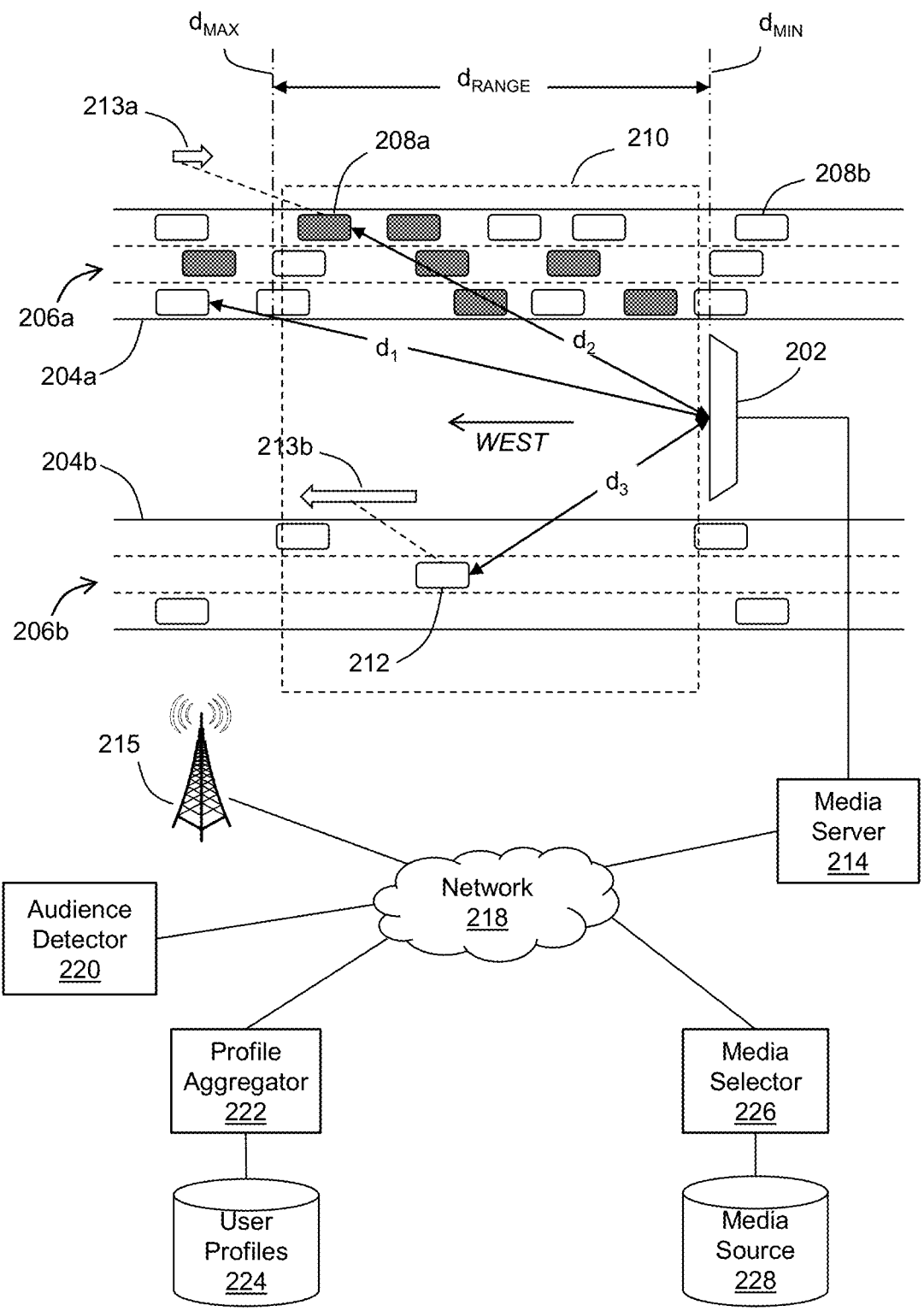
FIG. 2 depicts an illustrative embodiment of a system that selects media content for presentation at a media presentation device according to an example scenario of mobile devices.

FIG. 2 depicts an illustrative embodiment of a system 200 that selects media content for presentation at a media presentation device positioned with respect to a roadway, according to an example scenario of mobile devices. A digital billboard 202 is positioned along a median strip of an East-West segment of roadway or highway having a number of eastbound lanes 204a and a number of westbound lanes 204b. The digital billboard 202 includes a display screen that is facing West, to provide messages and/or advertisements to eastbound traffic 206a along the eastbound roadway segment 204a. In the illustrative example, seventeen cars 208a, 208b are on the eastbound segment of roadway 204a. A distance, e.g., $d_1$, $d_2$, can be drawn from a display surface of the digital billboard to each respective car 208a, 208b (generally 208) on the roadway segment 204a. The illustrative example also identifies a minimum viewing distance $d_{min}$ and a maximum viewing distance $d_{max}$, with a range, $d_{range}$ defined between the $d_{max}$ and $d_{min}$.

An exposure region can be determined extending along the eastbound lanes 204a between $d_{max}$ and $d_{min}$, e.g., a rectangular exposure region 210. In the illustrative example, only eleven of the seventeen cars 208 including mobile communication devices are substantially within the exposure region 210. Users associated with mobile devices in other cars on the eastbound lanes 204a that fall outside of the exposure region 210 are not considered to be within the audience of users. Likewise, users associated with mobile devices in other cars 212 on the westbound lanes 204b fall inside of the exposure region 210 of the digital display 202, but are not considered as their westbound trajectories indicate they are driving away from the display 202.

Also illustrated in FIG. 2 is a mobile service provider tower 215, e.g., a mobile cellular radio communications tower 215. The cell tower 215 is in wireless communication with mobile communication devices in one or more of the cars 208, 212 in the roadway segments 204a, 204b proximate to the digital billboard 202. Although one cell tower 215 is illustrated, it is understood that more than one cell tower 215 can be in communication with one or more of the cars 208, 212, e.g., according to different mobile service providers, geographical differences, levels of service.

Base station equipment, e.g., at the cell tower 215, or equipment at some other location, can be configured to determine a location of each of the cars 208, 212 in wireless communication with the cell tower 215. The base station equipment, or other equipment in communication with the base station equipment can be configured to determine a trajectory of one or more of the cars 208, 212. In some embodiments a trajectory can be determined for each of the individual cars 208, 212. Alternatively or in addition, one or more aggregate or representative trajectories can be determined for one or more groups of cars 208, 212.

The term trajectory, as used herein, can include one or more of position, e.g., geo-coordinates, direction, e.g., compass bearing, and motion. Motion can include one or more of speed, velocity, acceleration, deceleration. In some embodiments, motion aspects of the trajectory can be determined according to two or more position updates. Thus, at a first time $t_1$, a first position at time $t_1$ of $p(t_1)$ is determined according to a first set of geo-coordinates $x_1$, $y_1$. At a later time $t_2$, a second position $p(t_2)$ is determined according to a second set of geo-coordinates $x_2$, $y_2$. A velocity can be determined according to a positional vector from $p(t_1)$ to $p(t_2)$ over the time difference $t_2-t_1$. Namely, a velocity $V(t_2)=[p(t_1)-p(t_2)]/(t_2-t_1)$. Standard vector analysis produces a magnitude of $V(t_2)$ and a direction or angle of $V(t_2)$. Similar techniques can be used to determine acceleration, deceleration, averages, and the like.

In the illustrative system 200, an audience detector 220 receives spatial information, including one or more trajectories, e.g., a first trajectory 213a, of the eastbound vehicles 206a and a second trajectory 213b of the westbound vehicles 206b. The trajectories are illustrated as vectors with arrows indicating direction and sizes corresponding to magnitude. Thus the first trajectory 213a being much shorter than the second trajectory 213b indicates that eastbound traffic is traveling much slower than westbound traffic. Such a scenario might be experienced during each morning rush hour commute, with the pattern being reversed between eastbound and westbound for the evening rush hour commute.

The audience detector 220 may receive trajectories for mobile devices within other vehicles, and/or pedestrians traveling in other directions within a proximity of the digital billboard 202 and/or at distances remote from the digital billboard. The audience detector 220 can be configured to process the trajectories 213a, 213b (generally 213), and in some instance, determine the trajectories 213 from position information obtained by the one or more cell towers 215, e.g., by way of one or more networks 218. Although a single network cloud 218 is illustrated, it is understood that network connectivity between and among any of the devices of the system 200 can be accomplished by one or more networks, such as proprietary networks, e.g., of mobile service providers, public networks, e.g., the Internet, and the like. The audience detector 220 determines which mobile devices, e.g., those cars 208 within the exposure region 210 and traveling eastbound, that will be exposed to any messages and/or advertisements presented at the digital billboard 202.

A profile aggregator 222 receives identities of the audience of users from the audience detector 220. The profile aggregator 222 obtains corresponding user profiles, e.g., from a database of user profiles, or other source of user characteristics. The profile aggregator 222 determines an aggregate user profile, e.g., according to any suitable technique including those techniques disclose herein. A media selector 226 receives the aggregate user profile from the profile aggregator 222, e.g., by way of the network 218. The media selector selects one or more media content items for display by the digital billboard according to the aggregate profile of the audience of users. A media server 214 receives either the media content items themselves, or an indication of the media content items, e.g., a pointer, a uniform resource locator, or other suitable identifier. The media server 214 performs any reformatting and/or scheduling required and forwards the media contents items to the digital billboard 202 for display thereon. The processing disclosed in relation to FIG. 2 can be accomplished in real time or near-real time, such that audience members and media content can be identified and displayed while mobile devices of the audience of users pass within the exposure region 210 of the digital billboard 202.

Figure 3:
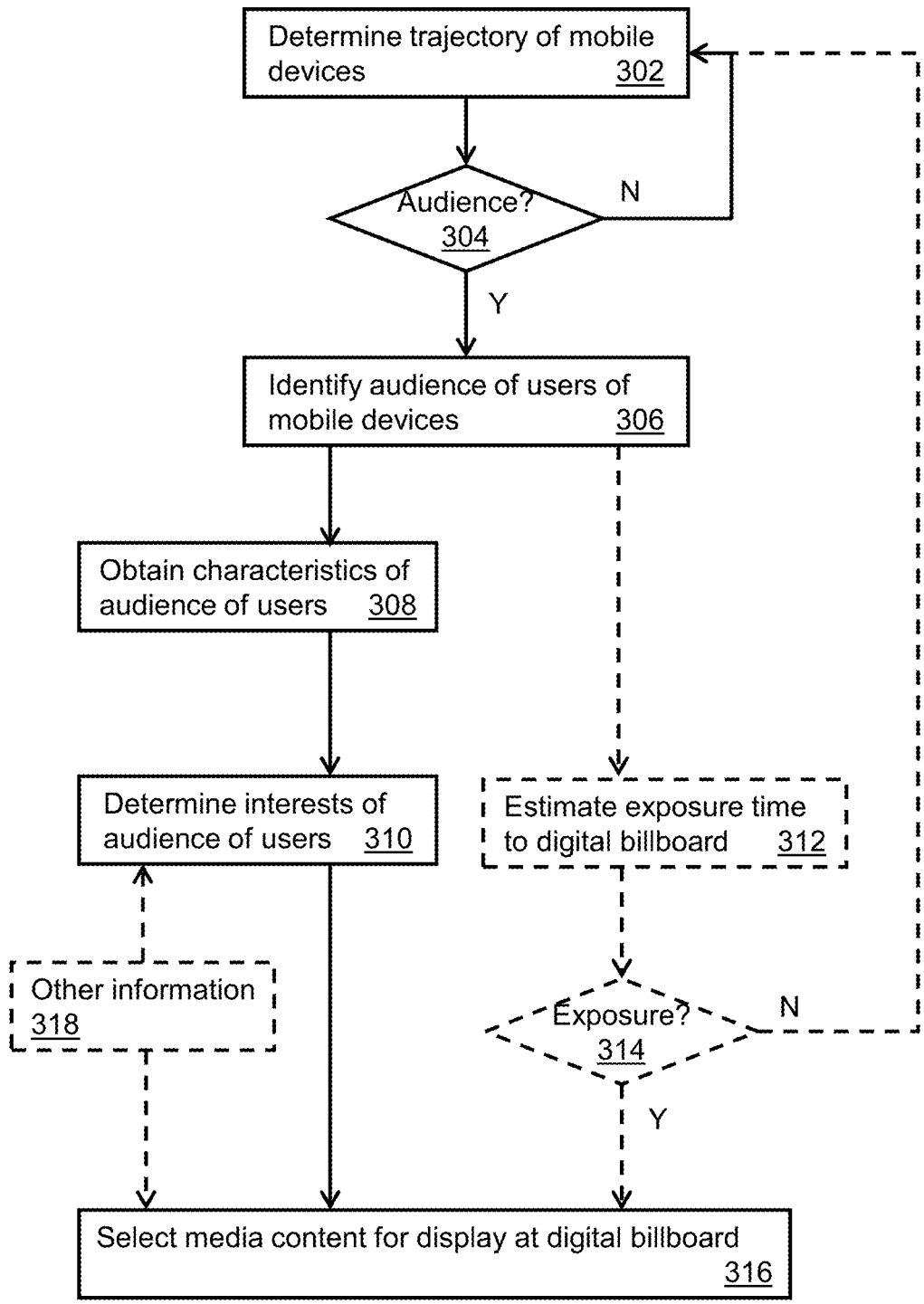
FIG. 3 depicts an illustrative embodiment of a process used in portions of the systems described in FIG. 1 and FIG. 2.

FIG. 3 depicts an illustrative embodiment of a process used in portions of the systems described in FIG. 1 and FIG. 2. A trajectory of the mobile devices is determined at 302, e.g., by one or more of the spatial processor 102 (FIG. 1) and the audience detector 106, 220 (FIG. 2). A determination whether the trajectory suggests the mobile device is within an audience is made at 304. The determination can be accomplished, e.g., by one or more of the exposure estimator 108, and the audience detector 106, 220. To the extent that the determination indicates the mobile device is not within the audience at 304, the process continues to determine a trajectory of another mobile device at 302. To the extent that the determination indicates the mobile device is within the audience, a corresponding user of the mobile device is associated with the audience at 306. The process can be repeated for other mobile devices, e.g., during a sample period, by repeating steps 302-306 for the other mobile devices.

Characteristics of the audience of users are determined at 308. Determination of characteristics can be accomplished by one or more of identifying a user profile and/or predetermined user characteristics, e.g., according to one or more of the individuals' profiles store 110, and the profile aggregator 222. Characteristics can include one or more of a demographic and a psychographic characteristic of a user.

A determination of one or more interests of the audience of users is determined at 310. An association and/or selection of one or more interest(s) can be determined according to one or more of identities of the audience of users and characteristics determined at 308. In some embodiments, a determination of interests at 310 depends to at least some degree on other information 218. Examples of other information include prior behavior, e.g., prior web searches, prior purchases, answers to questions, and the like.

In some embodiments, an estimate of exposure to media content presented at a media presentation device is determined at 312 (shown in phantom). In some embodiments, a determination is made at 314 (also shown in phantom) whether the exposure of the audience of users meets an exposure criteria at 314. To the extent the exposure meets the exposure criteria, a media content item is selected at 316 for presentation at the media presentation device.

Selection of the media content item at 316 can be based upon the interests of the users determined at 310. Alternatively or in addition, selection of the media content item at 316 can be based upon satisfaction of the exposure criteria at 314. Selection of media content for presentation at the media presentation device can be determined according to various logical combinations of the determined interests of the audience of users, satisfaction of the exposure criteria and/or other information obtained at 318 (shown in phantom). Examples of other information include time of day, day of week, season, location of media presentation device. Other example of information include, without limitation, prior behavior, e.g., prior web searches, prior purchases, answers to questions, and the like.

Figure 4:
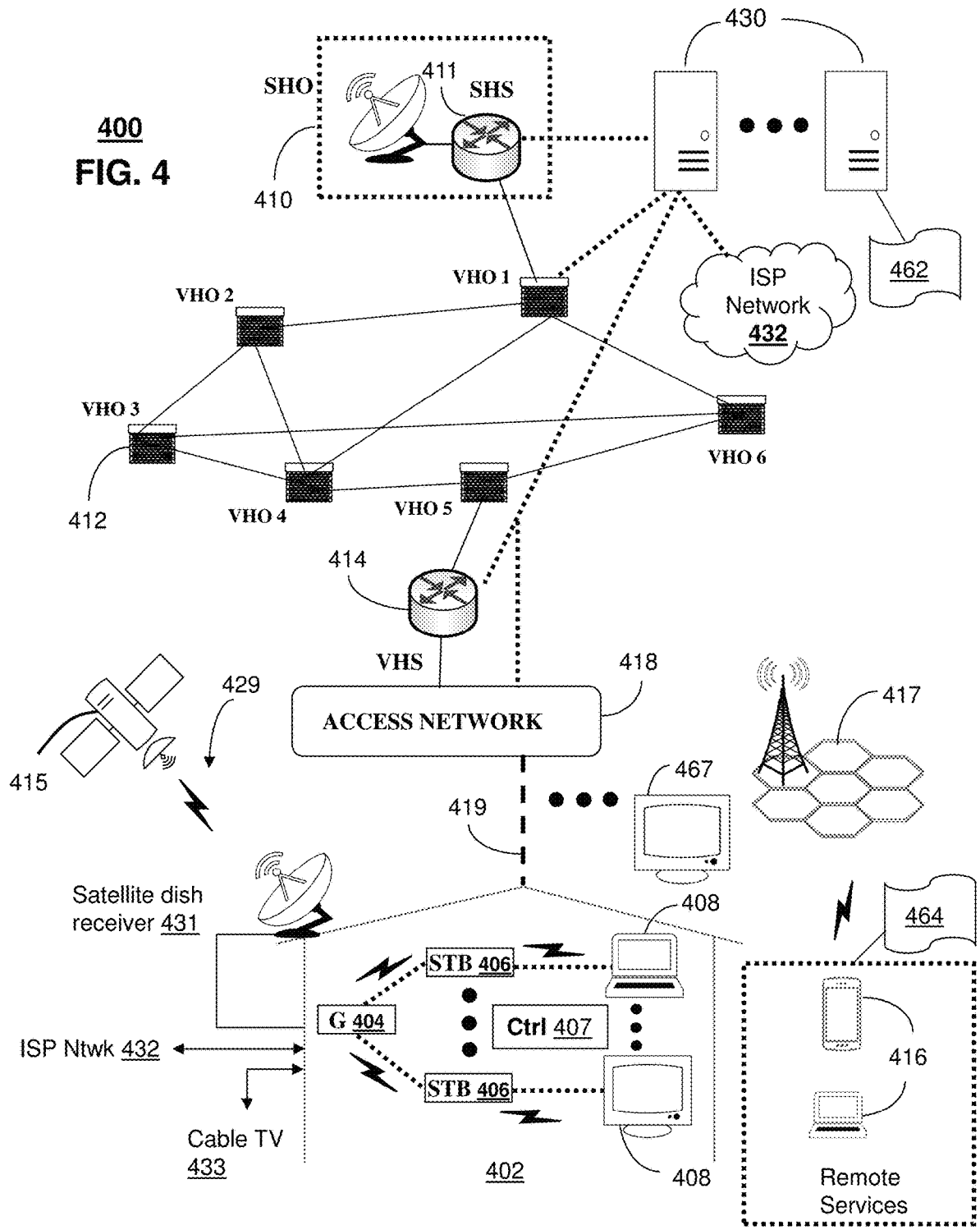
FIGS. 4-5 depict illustrative embodiments of communication systems that provide media services including services that select media content for presentation at a media presentation device as described in FIGS. 1-3.

FIG. 4 depicts an illustrative embodiment of a first communication system 400 for delivering media content. The communication system 400 can represent an Internet Protocol Television (IPTV) media system. Communication system 400 can be overlaid or operably coupled with systems that select media content for presentation at a media presentation device as described in relation to FIGS. 1 and 2, as another representative embodiment of communication system 400. Selecting media content for presentation at a media presentation device, such as a digital billboard, includes determining a trajectory of a number of mobile devices relative to the digital billboard. An audience of users of the number of mobile devices is identified and user characteristics are obtained of the audience of users. A representative interest of the audience of users is determined from the user characteristics of the audience of users, and a media content item is selected according to the representative interest and the trajectory. The media content item is presented at the digital billboard to expose the audience of users to the media content item.

The IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. (Bluetooth® and ZigBee® are trademarks registered by the Bluetooth® Special Interest Group and the ZigBee® Alliance, respectively). By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as a media content selector (herein referred to as media selection server 430). The media selection server 430 can use computing and communication technology to perform function 462, which can include among other things, determining a trajectory of a number of wireless communication devices 416 relative to the digital billboard 467. An audience of users of the number of wireless communication devices 416 is identified by the media selection server 430 and user characteristics are obtained of the audience of users. A representative interest of the audience of users is determined by the media selection server 430 from the user characteristics of the audience of users, and a media content item is selected according to the representative interest and the trajectory. The selected media content item is presented at the digital billboard 467 to expose the audience of users to the media content item. The wireless communication devices 416 can be provisioned with software functions 464, respectively, to utilize the services of the media selection server 430.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
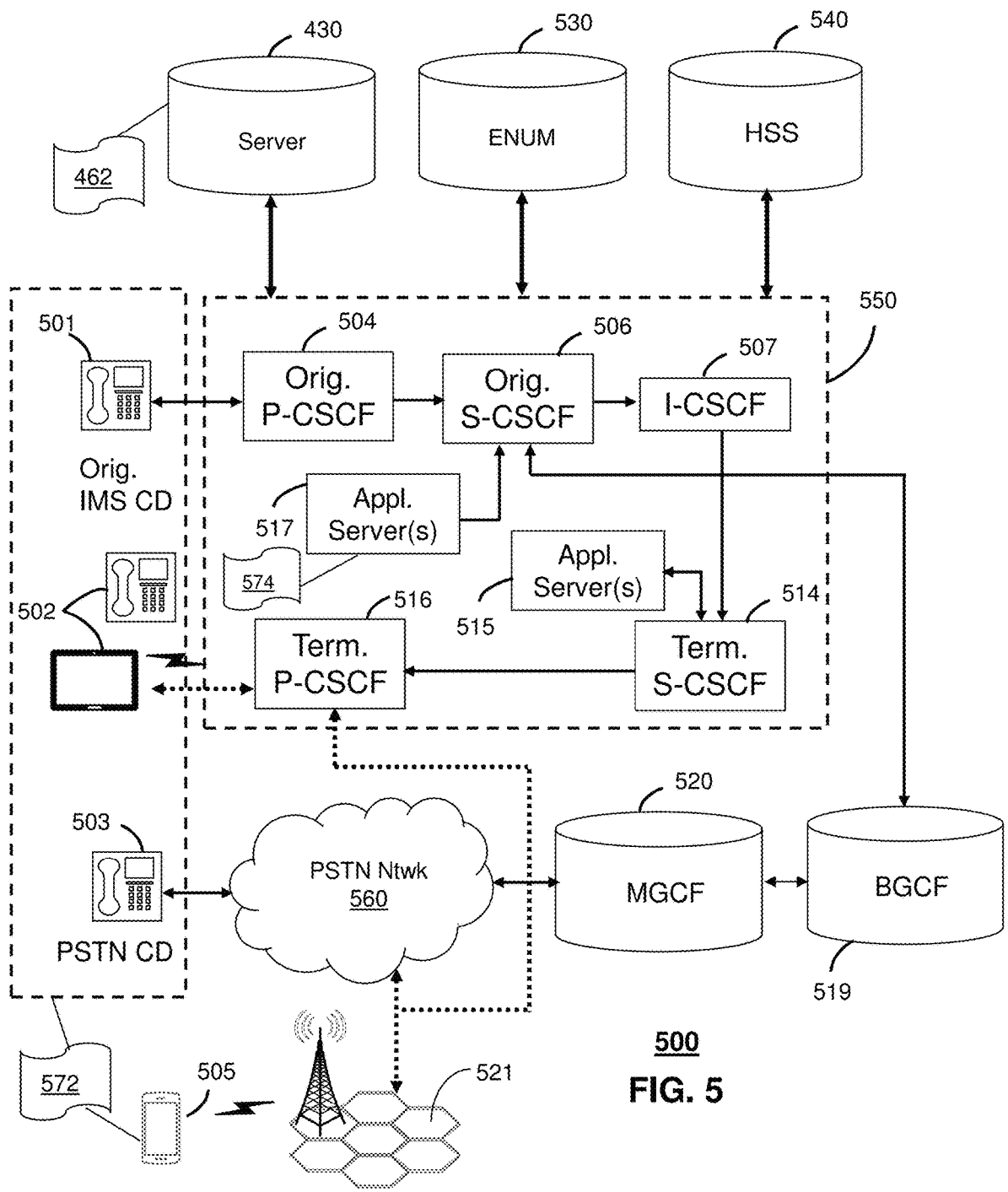

FIG. 5 depicts an illustrative embodiment of a communication system 500 employing an IP Multimedia Subsystem (IMS) network architecture to facilitate the combined services of circuit-switched and packet-switched systems. Communication system 500 can be overlaid or operably coupled with systems that select media content for presentation at a media presentation device as described in relation to FIGS. 1 and 2, and communication system 400 as another representative embodiment of communication system 400. Selecting media content for presentation at a media presentation device, such as a digital billboard, includes determining a trajectory of a number of mobile devices relative to the digital billboard. An audience of users of the number of mobile devices is identified and user characteristics are obtained of the audience of users. A representative interest of the audience of users is determined from the user characteristics of the audience of users, and a media content item is selected according to the representative interest and the trajectory. The media content item is presented at the digital billboard to expose the audience of users to the media content item.

Communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (ASs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 5 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The media selection server 430 of FIG. 4 can be operably coupled to the second communication system 500 for purposes similar to those described above. The media selection server 430 can perform function 462 and thereby provide media content selection services to the wireless CDs 505 of FIG. 5. CDs 501, 502, 503 and 505, which can be adapted with software to perform function 572 to utilize the services of the media selection server 430. The media selection server 430 can be an integral part of the application server(s) 517 performing function 572, which can be substantially similar to function 462 and adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 6:
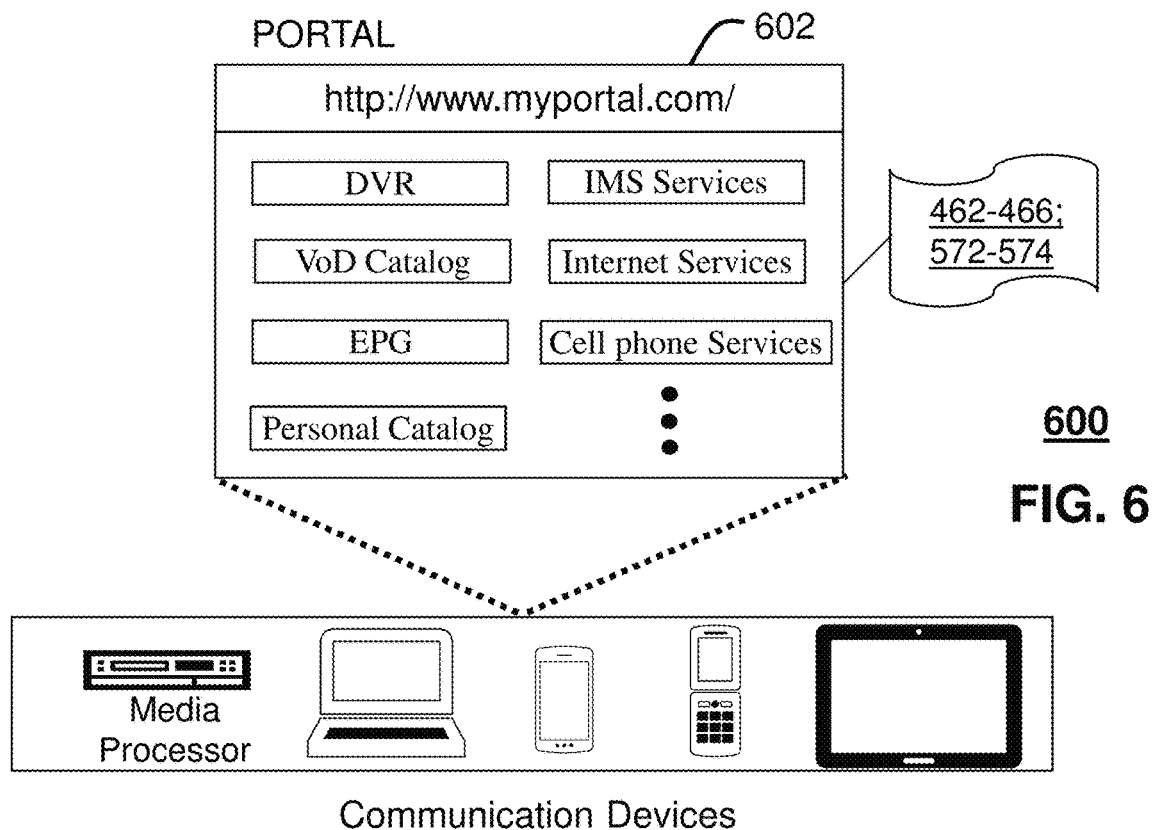
FIG. 6 depicts an illustrative embodiment of a web portal for interacting with the communication systems of FIGS. 1-2, and 4-5.

FIG. 6 depicts an illustrative embodiment of a web portal 602 which can be hosted by server applications operating from the computing devices 430 of the communication system 400 illustrated in FIG. 4. Communication system 600 can be overlaid or operably coupled with systems that select media content for presentation at a media presentation device as described in relation to FIGS. 1 and 2, communication 400, and/or communication system 500 as another representative embodiment of systems that select media content for presentation at a media presentation device as described in relation to FIGS. 1 and 2, communication 400, and/or communication system 500. Selecting media content for presentation at a media presentation device, such as a digital billboard, includes determining a trajectory of a number of mobile devices relative to the digital billboard. An audience of users of the number of mobile devices is identified and user characteristics are obtained of the audience of users. A representative interest of the audience of users is determined from the user characteristics of the audience of users, and a media content item is selected according to the representative interest and the trajectory. The media content item is presented at the digital billboard to expose the audience of users to the media content item. The web portal 602 can be used for managing services of communication systems 400-500. A web page of the web portal 602 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1-2. The web portal 602 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 602 can also be used for provisioning IMS services described earlier, provisioning Internet services, provisioning cellular phone services, and so on.

The web portal 602 can further be utilized to manage and provision software applications 462-464, and 572-574 to adapt these applications as may be desired by subscribers and/or service providers of systems that select media content for presentation at a media presentation device as described in relation to FIGS. 1 and 2, and communication systems 400-500.

Figure 7:
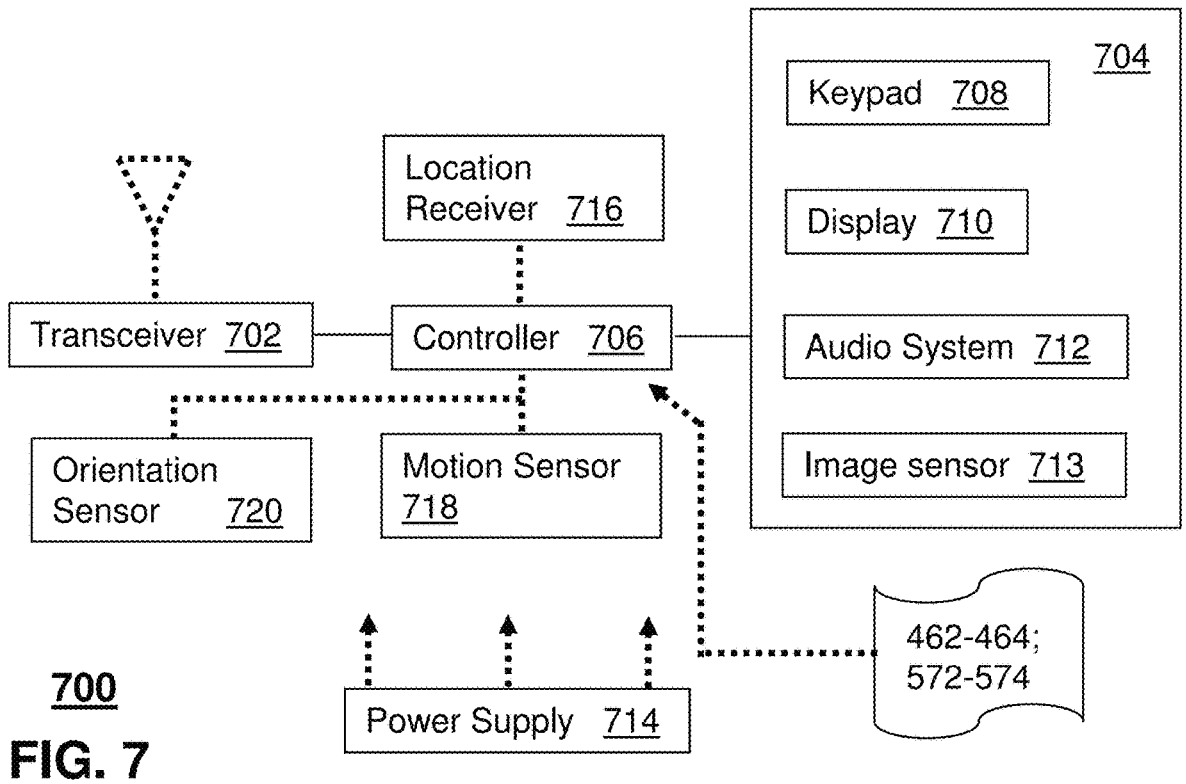
FIG. 7 depicts an illustrative embodiment of a communication device.

FIG. 7 depicts an illustrative embodiment of a communication device 700. Communication device 700 can serve in whole or in part as an illustrative embodiment of the devices depicted in FIGS. 1 and/or 2, and FIGS. 4-5. Selecting media content for presentation at a media presentation device, such as a digital billboard, includes determining a trajectory of a number of mobile devices, e.g., communication device 700, relative to the digital billboard. An audience of users of the number of mobile devices is identified and user characteristics are obtained of the audience of users. A representative interest of the audience of users is determined from the user characteristics of the audience of users, and a media content item is selected according to the representative interest and the trajectory. The media content item is presented at the digital billboard to expose the audience of users to the media content item.

To enable these features, communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth, ZigBee, WiFi, DECT, or cellular communication technologies, just to mention a few. Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of the media processor 406, the media devices 408, or the portable communication devices 416 of FIG. 4, as well as the IMS CDs 501-502 and PSTN CDs 503-505 of FIG. 5. It will be appreciated that the communication device 700 can also represent other devices that can operate in communication systems 400-500 of FIGS. 4-5 such as a gaming console and a media player.

The communication device 700 shown in FIG. 7 or portions thereof can serve as a representation of one or more of the devices of system of FIGS. 1 and/or 2, communication system 400, and communication system 500. In addition, the controller 706 can be adapted in various embodiments to perform the functions 462-464 and 572-574, respectively.

Upon reviewing the aforementioned embodiments, it would be evident to an artisan with ordinary skill in the art that said embodiments can be modified, reduced, or enhanced without departing from the scope of the claims described below. For example, a media presentation device can present media content items selected from one or more of a visual content item, an audio content item, and a sensory content item. The exposure region can be determined according to one or more of the media presentation device and the media content item, such that audience members can perceive the media content item when positioned within the exposure region. Other embodiments can be used in the subject disclosure. Alternatively or in addition, correlations can be drawn between exposure of members of the audience of users of mobile devices to media content presented at the media presentation device. Example correlations include one or more of online activity, e.g., search terms, purchases made before and/or after the exposure. Accordingly, such correlations can be used to measure effectiveness of presentation of messages and/or advertisements on the media presentation devices. Such correlation results can be determined collectively for a number of users of mobile devices or individually for one or more individual users of mobile devices.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
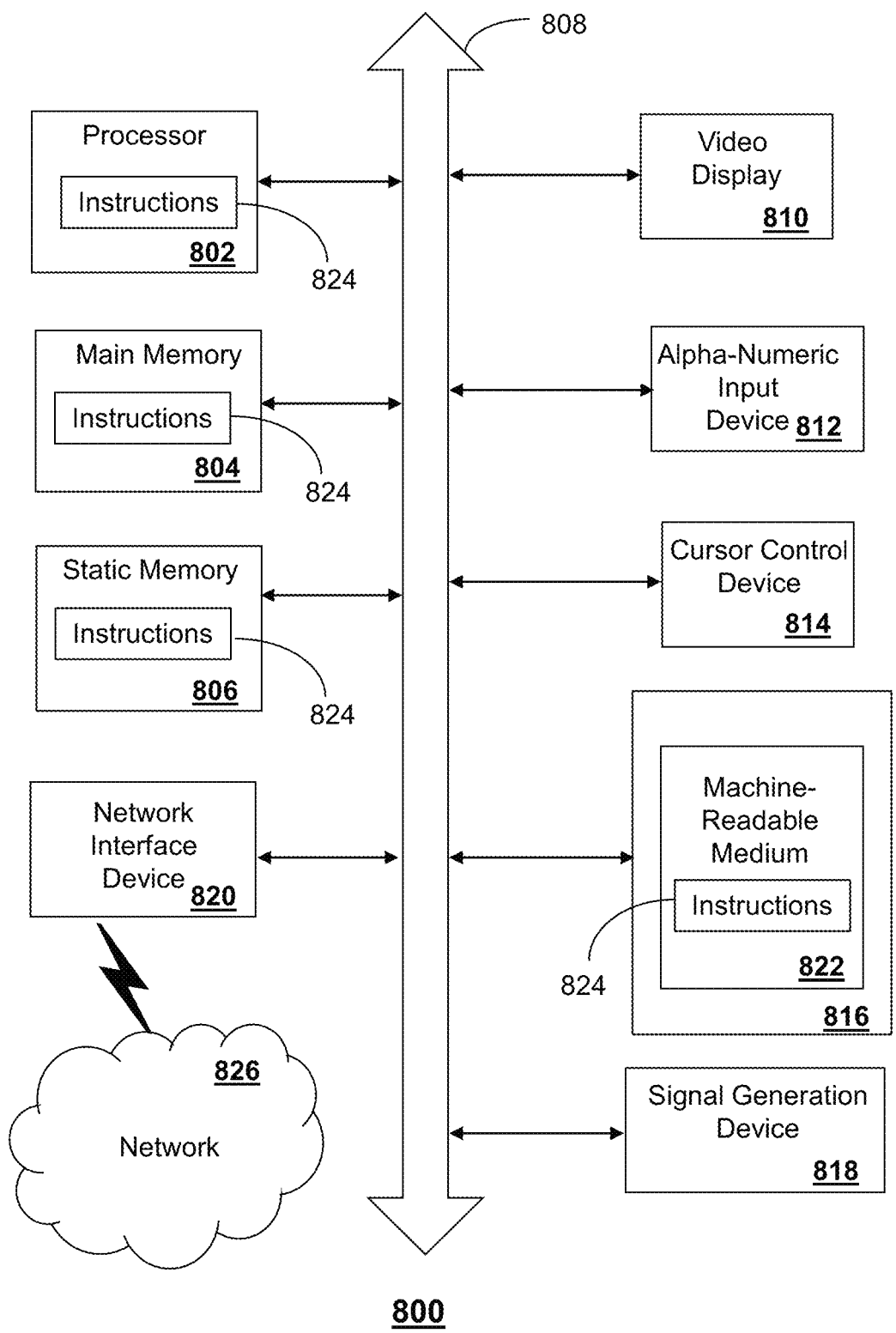
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the media selection server 430, the media processor 406, the spatial processor 102, the audience detector 106, 220, a profile aggregator 114, 222, a media selector 226, a media server 120, 204, the exposure estimator 108, the media selector 118 and other devices of FIGS. 1-2 and 4-7. In some embodiments, the machine may be connected (e.g., using a network 826) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display. The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
 determining, by a processing system including a processor, a representative trajectory of a plurality of mobile devices relative to a media presentation device, the representative trajectory comprising a position and a bearing;
 identifying, by the processing system, an audience, wherein the audience comprises users of the plurality of mobile devices;
 obtaining, by the processing system, user characteristics of the audience;
 determining, by the processing system, a representative interest of the audience from the user characteristics of the audience;
 determining, by the processing system for each member of the audience, a proximity of a mobile device associated with the member of the audience relative to a location of the media presentation device;
 estimating, by the processing system for each member of the audience, a duration of exposure of the mobile device associated with the member of the audience to the media presentation device based on the representative trajectory and the proximity, resulting in an estimated duration of exposure, wherein the duration of exposure is estimated prior to presentation of a media content item at the media presentation device; and
 selecting, by the processing system subsequent to the estimating, the media content item according to the representative interest and the estimated duration of exposure, wherein the media content item is presented at the media presentation device to expose the audience to the media content item, wherein the media content item is preconfigured in a first format for presentation in accordance with the estimated duration of exposure being below a predetermined threshold associated with the media content item and in a second format in accordance with the estimated duration of exposure being above the predetermined threshold, wherein the media content item in the first format has a duration less than the media content item in the second format.

2. The method of claim 1, wherein the obtaining the user characteristics of the audience comprises:
 obtaining, for each member of the audience, individual user characteristics comprising one of demographic data, psychographic data, or both;
 selecting members of the audience according to the individual user characteristics, resulting in selected members of the audience; and
 selecting the user characteristics of the audience according to the individual user characteristics of the selected members of the audience.

3. The method of claim 1, wherein the determining of the representative interest comprises determining a collective profile of the audience.

4. The method of claim 1, wherein the estimating the duration of exposure comprises estimating a time that a member of the audience is within an exposure distance of the media presentation device according to the representative trajectory relative to the media presentation device.

5. The method of claim 1, further comprising updating, by the processing system, the audience in accordance with a mobile device of the plurality of mobile devices entering or leaving an exposure region defined in part by a maximum viewing distance from the media presentation device.

6. The method of claim 1, wherein the media content item comprises advertising content, and wherein the estimated duration of exposure has a value associated therewith.

7. The method of claim 1, wherein the media content item comprises one of audio, video or a combination of audio and video.

8. A system, comprising:
 a processor; and
 a memory that stores executable instructions that, when executed by the processor, facilitate performance of operations, comprising:
  determining a representative trajectory of a plurality of mobile devices relative to a media presentation device;
  identifying an audience, wherein the audience comprises users of the plurality of mobile devices;
  obtaining user characteristics of the audience;
  determining a representative interest of the audience from the user characteristics of the audience;
  estimating an exposure of the audience to the media presentation device based on the representative trajectory of the plurality of mobile devices relative to the media presentation device, resulting in an estimated exposure, wherein the exposure is estimated prior to presentation of a media content item at the media presentation device; and
  selecting, subsequent to the estimating, the media content item according to the representative interest and the estimated exposure, wherein the media content item is presented at the media presentation device to expose the audience to the media content item, wherein the media content item is preconfigured in a first format for presentation in accordance with the estimated exposure being below a predetermined threshold associated with the media content item and in a second format in accordance with the estimated exposure being above the predetermined threshold, wherein the media content item in the first format has a duration less than the media content item in the second format.

9. The system of claim 8, wherein the representative trajectory comprises a position and a bearing, and wherein estimating the exposure of the audience comprises estimating the exposure responsive to:
   determining, for each member of the audience, a proximity of a mobile device of the plurality of mobile devices relative to a location of the media presentation device; and
   estimating, for each member of the audience, a duration of exposure of the mobile device of the plurality of mobile devices to the media content item presented at the media presentation device responsive to one of the proximity, the position, the bearing or a combination thereof.

10. The system of claim 9, wherein obtaining the user characteristics of the audience comprises:
    obtaining, for each member of the audience, individual user characteristics comprising one of demographic data, psychographic data, or both;
    selecting members of the audience according to the individual user characteristics, resulting in selected members of the audience; and
    selecting the user characteristics of the audience according to the individual user characteristics of the selected members of the audience.

11. The system of claim 8, wherein the determining of the representative interest comprises determining a collective profile of the audience.

12. The system of claim 8, wherein the estimating the exposure comprises estimating a time that a member of the audience is within an exposure distance of the media presentation device according to the representative trajectory relative to the media presentation device.

13. The system of claim 8, wherein the media content item comprises advertising content, and wherein the estimated exposure has a value associated therewith.

14. The system of claim 8, wherein the media content item comprises one of audio, video or a combination of audio and video.

15. A non-transitory machine-readable storage medium, comprising executable instructions that, when executed by a processor, facilitate performance of operations, comprising:
    determining a representative trajectory of a plurality of mobile devices relative to a media presentation device;
    identifying an audience, wherein the audience comprises users of the plurality of mobile devices;
    obtaining user characteristics of the audience;
    determining a representative interest of the audience from the user characteristics of the audience;
    estimating an exposure of the audience to the media presentation device based on the representative trajectory, resulting in an estimated exposure, wherein the exposure is estimated prior to presentation of a media content item at the media presentation device; and
    selecting, subsequent to the estimating, a media content item according to the representative interest and the estimated exposure, wherein the media content item is presented at the media presentation device to expose the audience to the media content item, wherein the media content item is preconfigured in a first format for presentation in accordance with the estimated exposure being below a predetermined threshold associated with the media content item and in a second format in accordance with the estimated exposure being above the predetermined threshold, wherein the media content item in the first format has a duration less than the media content item in the second format.

16. The non-transitory machine-readable storage medium of claim 15, further comprising:
    determining, for each member of the audience, a proximity of a mobile device of the plurality of mobile devices relative to a location of the media presentation device; and
    estimating, for each member of the audience, a duration of exposure of the mobile device of the plurality of mobile devices to the media content item presented at the media presentation device responsive to the representative trajectory of the plurality of mobile devices relative to the media presentation device.

17. The non-transitory machine-readable storage medium of claim 16, wherein obtaining the user characteristics of the audience comprises:
    obtaining, for each member of the audience, individual user characteristics comprising one of demographic data, psychographic data, or both;
    selecting members of the audience according to the individual user characteristics, resulting in selected members of the audience; and
    selecting the user characteristics of the audience according to the individual user characteristics of the selected members of the audience.

18. The non-transitory machine-readable storage medium of claim 15, wherein the estimating is based on the representative trajectory of the plurality of mobile devices relative to the media presentation device.

19. The non-transitory machine-readable storage medium of claim 15, wherein the determining of the representative interest comprises determining a collective profile of the audience.

20. The non-transitory machine-readable storage medium of claim 15, wherein the media content item comprises one of audio, video or a combination of audio and video.

* * * * *